United States Patent
Zhang

(10) Patent No.: US 11,044,000 B2
(45) Date of Patent: Jun. 22, 2021

(54) SCHEDULING METHOD, BASE STATION, AND TERMINAL

(71) Applicant: Huawei Technologies Co., Ltd., Shenzhen (CN)

(72) Inventor: Pengcheng Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/552,589

(22) Filed: Aug. 27, 2019

(65) Prior Publication Data

US 2019/0386731 A1 Dec. 19, 2019

Related U.S. Application Data

(63) Continuation of application No. PCT/CN2017/075274, filed on Feb. 28, 2017.

(51) Int. Cl.
*H04B 7/06* (2006.01)
*H04L 1/00* (2006.01)
(Continued)

(52) U.S. Cl.
CPC ......... *H04B 7/0632* (2013.01); *H04B 7/0695* (2013.01); *H04L 1/0026* (2013.01);
(Continued)

(58) Field of Classification Search
CPC ....... H04B 7/06; H04B 7/0632; H04W 24/02; H04W 24/10; H04L 5/00; H04L 1/00; H04L 5/0048; H04L 5/007; H04L 1/0026
See application file for complete search history.

(56) References Cited

U.S. PATENT DOCUMENTS

2010/0061494 A1* 3/2010 Yu .................. H04B 7/0669
375/346
2010/0273499 A1 10/2010 Rensburg et al.
(Continued)

FOREIGN PATENT DOCUMENTS

CN 101616433 A 12/2009
CN 101753186 A 6/2010
(Continued)

OTHER PUBLICATIONS

"Channel Reciprocity Modeling and Performance Evaluation," 3GPP TSG RAN WG1 Meeting #59bis, Valencia, Spain, R1-100426, pp. 1-10, 3rd Generation Partnership Project, Valbonne, France (Jan. 18-22, 2010).
(Continued)

*Primary Examiner* — Chi Ho A Lee
*Assistant Examiner* — Andrew Lee
(74) *Attorney, Agent, or Firm* — Leydig, Voit & Mayer, Ltd.

(57) ABSTRACT

Embodiments of the present invention disclose a scheduling method, a base station, and a terminal. The method includes: performing, by a base station according to a preset matrix, orthogonal encoding on logical port information corresponding to a downlink reference signal, and mapping the logical port information obtained after the orthogonal encoding to a corresponding physical channel for sending; receiving channel quality indicator information fed back by a terminal, and calculating a spectral efficiency gain obtained after wavelength division multiplexing; and performing, according to the spectral efficiency gain, radio resource scheduling for the wavelength division multiplexing.

14 Claims, 5 Drawing Sheets

(51) Int. Cl.
*H04L 5/00* (2006.01)
*H04W 24/02* (2009.01)
*H04W 24/10* (2009.01)

(52) U.S. Cl.
CPC .......... *H04L 5/0007* (2013.01); *H04L 5/0048* (2013.01); *H04W 24/02* (2013.01); *H04W 24/10* (2013.01)

(56) References Cited

U.S. PATENT DOCUMENTS

| | | | |
|---|---|---|---|
| 2011/0164668 | A1 | 7/2011 | Hoek et al. |
| 2012/0264441 | A1* | 10/2012 | Chandrasekhar ..... H04L 5/0073 455/450 |
| 2013/0114425 | A1* | 5/2013 | Sayana ................. H04B 7/024 370/252 |
| 2013/0301542 | A1* | 11/2013 | Krishnamurthy ... H04W 72/042 370/329 |
| 2014/0334391 | A1* | 11/2014 | Khoshnevis .......... H04L 5/0057 370/329 |
| 2015/0358064 | A1 | 12/2015 | Benjebbour et al. |
| 2016/0050002 | A1* | 2/2016 | Wei ..................... H04B 7/0617 370/329 |
| 2016/0352395 | A1* | 12/2016 | Zhu ....................... H04L 5/0007 |
| 2016/0352403 | A1* | 12/2016 | Kishiyama .......... H04B 7/0413 |
| 2017/0099092 | A1* | 4/2017 | Kakishima ............... H04L 1/00 |
| 2018/0302139 | A1* | 10/2018 | Huang ................. H04B 7/063 |
| 2019/0052331 | A1* | 2/2019 | Chang ................. H04B 7/0626 |
| 2019/0173553 | A1* | 6/2019 | Park ..................... H04B 7/0617 |
| 2020/0045712 | A1* | 2/2020 | Sasaki ................ H04L 27/2646 |

FOREIGN PATENT DOCUMENTS

| | | |
|---|---|---|
| CN | 102084708 A | 6/2011 |
| CN | 102484509 A | 5/2012 |
| CN | 105027461 A | 11/2015 |
| JP | 2007019806 A | 1/2007 |
| JP | 2007336547 A | 12/2007 |
| WO | 2006070478 A1 | 7/2006 |
| WO | 2007088624 A1 | 8/2007 |
| WO | 2010122749 A1 | 10/2010 |
| WO | 2016204591 A1 | 12/2016 |

OTHER PUBLICATIONS

Zhang et al., "Research on Dual-Stream Beamforming Technology in LTE Systems," Guangzhou Jiesai Communication Planning and Design Institution, pp. 1-6 (2013). With English abstract.

Fukuzono et al.,"Weighted-Combining Calibration for Implicit Feedback Beamforming on Downlink Multiuser MIMO Systems," IEEE 24th International Symposium on Personal, Indoor and Mobile Radio Communications: Fundamentals and PHY Track, pp. 846-850, Institute of Electrical and Electronics Engineers, New York, New York (2013).

Hosein et al., "On the Performance of Downlink Beamforming with Synchronized Beam Cycles," pp. 1-5, Institute of Electrical and Electronics Engineers, New York, New York (2009).

"A view on the maximum number of orthogonal DL DMRS ports for NR MU-MIMO," 3GPP TSG-RAN WG1 #87, Reno, R1-1612839, pp. 1-4, 3rd Generation Partnership Project, Valbonne, France (Nov. 14-18, 2016).

CN/201780087532.5, Notice of Allowance/Search Report, dated Sep. 27, 2020.

* cited by examiner

SCHEDULING METHOD, BASE STATION, AND TERMINAL

CROSS-REFERENCE TO RELATED APPLICATIONS

This application is a continuation of International Application No. PCT/CN2017/075274, filed on Feb. 28, 2017. The disclosures of the aforementioned application is hereby incorporated by reference in their entireties.

TECHNICAL FIELD

Embodiments of the present invention relate to the field of communications technologies, and in particular, to a scheduling method, a base station, and a terminal.

BACKGROUND

With continuous development of communications technologies and wavelength division multiplexing technologies, efficient utilization of existing radio network resources may be implemented. However, because many user terminals access a cell, operators hope that a base station can provide a high-quality service for many user terminals. For a radio macro base station network, as a classical basic unit of a cellular network structure, a standard single site directional three-sector can be wrapped to achieve an optimal network coverage topology. A cell directional coverage beam optimized according to optimal coverage requires that a width of a main lobe with a gain of 3 dB is approximately 65 degrees. Such a pattern may ensure that a terminal may receive optimal broadcast level distribution in most locations of a cell. However, at the same time, a terminal in any location of the cell can obtain a gain of only a broadcast beam, and cannot obtain a gain that best meets a requirement of the terminal. For example, for some terminals on an edge, effective information sent to the terminals is broadcast in the entire cell. Because the terminals are located on the edge, a power of the received information is relatively low, and the information is useless or even may be interference to another terminal.

Based on this problem, in a multi-antenna system, in consideration of adaptation and a low gain of a broadcast beam, in the prior art, a method for using multiple beams to provide differentiated coverage is proposed. However, generally, when wavelength division is performed on a single sector, a problem exists, that is, normal wavelength division cannot be performed on a broadcast reference signal, because leakage between beams cannot be evaluated by using a reference signal. To ensure coverage, for a reference signal, each beam must have a component, and all the components are consistent. A broadcast beam of each port is fit by using multiple beams. For measurement of a reference signal, an independent beam cannot be identified in a measurement process. Therefore, when a terminal receives a reference signal, only the reference signal can be identified, and a specific component of the reference signal cannot be identified, and a component contribution of each beam cannot be estimated, and consequently, it is difficult to perform radio resource scheduling for wavelength division multiplexing.

SUMMARY

To resolve a technical problem, embodiments of the present invention provide a scheduling method, a base station, and a terminal, so that a base station can identify a beam and measure a beam component when a same cell is covered by using multiple beams, so as to implement radio resource scheduling for wavelength division multiplexing.

According to a first aspect, an embodiment of the present invention provides a scheduling method, including:

performing, by a base station according to a preset matrix, orthogonal encoding on logical port information corresponding to a downlink reference signal, and mapping the logical port information obtained after the orthogonal encoding to a corresponding physical channel for sending, where the logical port information obtained after the orthogonal encoding includes orthogonal beam components;

receiving channel quality indicator information fed back by a terminal, and calculating a spectral efficiency gain obtained after wavelength division multiplexing, where the channel quality indicator information is obtained, by the terminal, by measuring the logical port information that includes the orthogonal beam components; and performing, according to the spectral efficiency gain, radio resource scheduling for the wavelength division multiplexing.

Orthogonal encoding processing is performed on a reference signal by using multiple beams, and the reference signal is mapped to a corresponding physical channel for sending, so that information received by a terminal by using an air interface includes orthogonal beam components. A base station may measure an uplink multibeam receive level, that is, a reference signal received power, according to a result fed back by the terminal and according to channel reciprocity. Then, interference between multiple beams is estimated, a signal to interference plus noise ratio and a spectral efficiency gain obtained after wavelength division multiplexing are calculated, and radio resource scheduling for the wavelength division multiplexing is performed by using the corrected result. Therefore, multiple-input multiple-output multiplexing based on a broadcast reference signal is implemented, so that a capacity of a wireless communications system is greatly improved, and a high-quality service may be provided for more terminals.

In a possible implementation, the base station performs, according to the preset matrix, the orthogonal encoding on the logical port information corresponding to the downlink reference signal, and maps the logical port information obtained after the orthogonal encoding to the corresponding physical channel for sending, where orthogonal encoding mapping is specifically performed in the following manner:

$$\begin{bmatrix} P^0 \\ M \\ P^{M-1} \end{bmatrix} = \begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

where $P_n$ represents a port number of a logical channel $n=0, L, N-1$ and N is a quantity of logical channels; $P^m$ represents a beam number, and $m=0, L, M-1$; and $$\begin{bmatrix} b_0^0 & L & b_{N-1}^0 \\ M & O & M \\ b_0^{M-1} & L & b_{N-1}^{M-1} \end{bmatrix}$$

is a mapping matrix, vectors formed by elements in all rows of the mapping matrix are pairwise orthogonal, and a non-zero element included in each row of the mapping matrix is a weighting coefficient corresponding to a logical channel included in a logical channel group corresponding to the row.

By using the foregoing formula, orthogonal encoding pre-processing is performed on a reference signal based on multiple beams. With reference to a terminal feedback and determining and correction of a multibeam measurement based on reciprocity, MIMO multiplexing based on a broadcast reference signal is implemented, so that a capacity of a multi-antenna system can be greatly improved, and in particular, a situation of a currently limited broadcast control channel is greatly improved.

In a possible implementation, in a multibeam sector, each beam is corresponding to one physical channel, and if a quantity of logical ports is less than a quantity of multiple beams, pairwise adjacent beams are used to perform orthogonal encoding; or if a quantity of logical ports is greater than or equal to a quantity of multiple beams, pairwise adjacent beams are used to perform orthogonal encoding, or multibeam joint orthogonal encoding is performed.

In different situations, different orthogonal encoding manners are selected, so that an optimal encoding effect can be obtained, thereby improving a situation of a limited broadcast control channel.

In a possible implementation, the receiving channel quality indicator information fed back by a terminal, and calculating a spectral efficiency gain obtained after wavelength division multiplexing includes:

receiving, by the base station, the channel quality indicator information, and quantizing the channel quality indicator information into a linear value y of a signal to interference plus noise ratio obtained before the wavelength division multiplexing;

receiving and measuring an uplink reference signal or a sounding reference signal sent by the terminal to obtain a multibeam receive level, where a beam with a highest level is a service beam, physically adjacent beams are interference beams, a degree of interference between a service beam and an interference beam is beam isolation, and a linear value x of the beam isolation=a receive level of a service beam/a receive level of an interference beam;

calculating, according to the following formula, a signal to interference plus noise ratio z obtained after the wavelength division:

$z=(x^*y)/(y+x+1)$;

performing a table lookup according to a mapping table between a signal to interference plus noise ratio and spectral efficiency, to obtain spectral efficiency obtained before the wavelength division multiplexing and spectral efficiency obtained after the wavelength division multiplexing; and subtracting the spectral efficiency obtained before the wavelength division multiplexing from the spectral efficiency obtained after the wavelength division multiplexing, to obtain the spectral efficiency gain.

In a possible implementation, if the spectral efficiency gain is positive, radio resource scheduling for the wavelength division multiplexing is performed.

According to a second aspect, an embodiment of the present invention provides a base station, including:

a processing unit, configured to perform, according to a preset matrix, orthogonal encoding on logical port information corresponding to a downlink reference signal, and map the logical port information obtained after the orthogonal encoding to a corresponding physical channel for sending, where the logical port information obtained after the orthogonal encoding includes orthogonal beam components;

a sending unit, configured to send the logical port information obtained after the orthogonal encoding to a terminal; and a receiving unit, configured to receive channel quality indicator information fed back by the terminal, where the channel quality indicator information is obtained, by the terminal, by measuring the logical port information that includes the orthogonal beam components; where the processing unit is further configured to calculate a spectral efficiency gain obtained after wavelength division multiplexing, and perform, according to the spectral efficiency gain, radio resource scheduling for the wavelength division multiplexing.

In a possible implementation, the processing unit is specifically configured to perform orthogonal encoding mapping in the following manner:

$$\begin{bmatrix} P^0 \\ M \\ P^{M-1} \end{bmatrix} = \begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

where $P_n$ represents a port number of a logical channel n=0,L, N−1, and N is a quantity of logical channels; $P^m$ represents a beam number, and m=0,L, M−1; and $$\begin{bmatrix} b_0^0 & L & b_{N-1}^0 \\ M & O & M \\ b_0^{M-1} & L & b_{N-1}^{M-1} \end{bmatrix}$$

is a mapping matrix, vectors formed by elements in all rows of the mapping matrix are pairwise orthogonal, and a non-zero element included in each row of the mapping matrix is a weighting coefficient corresponding to a logical channel included in a logical channel group corresponding to the row.

In a possible implementation, in a multibeam sector, each beam is corresponding to one physical channel, and if a quantity of logical ports is less than a quantity of multiple beams, the encoding unit is specifically configured to use pairwise adjacent beams to perform orthogonal encoding; or if a quantity of logical ports is greater than or equal to a quantity of multiple beams, the encoding unit is specifically configured to use pairwise adjacent beams to perform orthogonal encoding or configured to perform multibeam joint orthogonal encoding.

In a possible implementation, the processing unit is specifically configured to:

receive the channel quality indicator information, and quantize the channel quality indicator information into a linear value y of a signal to interference plus noise ratio obtained before the wavelength division multiplexing;

receive and measure an uplink reference signal or a sounding reference signal sent by the terminal to obtain a multibeam receive level, where a beam with a highest level is a service beam, physically adjacent beams are interference beams, a degree of interference between a service beam and an interference beam is beam isolation, and a linear value x of the beam isolation=a receive level of a service beam/a receive level of an interference beam;

calculate, according to the following formula, a signal to interference plus noise ratio z obtained after the wavelength division:

$$z=(x^*y)/(y+x+1);$$

perform a table lookup according to a mapping table between a signal to interference plus noise ratio and spectral efficiency, to obtain spectral efficiency obtained before the wavelength division multiplexing and spectral efficiency obtained after the wavelength division multiplexing; and subtract the spectral efficiency obtained before the wavelength division multiplexing from the spectral efficiency obtained after the wavelength division multiplexing, to obtain the spectral efficiency gain.

In a possible implementation, the processing unit is specifically configured to:

if the spectral efficiency gain is positive, perform radio resource scheduling for the wavelength division multiplexing.

According to a third aspect, an embodiment of the present invention provides a base station, including:

a processor, a memory, an transceiver, and a bus, where the processor, the memory, and the transceiver are connected by using the bus to complete mutual communication, the transceiver is configured to transmit and receive signals, the memory is configured to store a set of program code, and the processor is configured to call the program code stored in the memory to perform the following operations:

performing, according to a preset matrix, orthogonal encoding on logical port information corresponding to a downlink reference signal, and mapping the logical port information obtained after the orthogonal encoding to a corresponding physical channel for sending, where the logical port information obtained after the orthogonal encoding includes orthogonal beam components;

receiving channel quality indicator information fed back by a terminal, and calculating a spectral efficiency gain obtained after wavelength division multiplexing, where the channel quality indicator information is obtained, by the terminal, by measuring the logical port information that includes the orthogonal beam components; and performing, according to the spectral efficiency gain, radio resource scheduling for the wavelength division multiplexing.

In a possible implementation, the processor is specifically configured to perform orthogonal encoding mapping in the following manner:

$$\begin{bmatrix} P^0 \\ M \\ P^{M-1} \end{bmatrix} = \begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

where $P_n$ represents a port number of a logical channel n=0,L, N−1, and N is a quantity of logical channels; $P^m$ represents a beam number, and m=0,L, M−1; and $$\begin{bmatrix} b_0^0 & L & b_{N-1}^0 \\ M & O & M \\ b_0^{M-1} & L & b_{N-1}^{M-1} \end{bmatrix}$$

is a mapping matrix, vectors formed by elements in all rows of the mapping matrix are pairwise orthogonal, and a non-zero element included in each row of the mapping matrix is a weighting coefficient corresponding to a logical channel included in a logical channel group corresponding to the row.

In a possible implementation, in a multibeam sector, each beam is corresponding to one physical channel, and if a quantity of logical ports is less than a quantity of multiple beams, the processor is specifically configured to use pairwise adjacent beams to perform orthogonal encoding; or if a quantity of logical ports is greater than or equal to a quantity of multiple beams, the processor is specifically configured to use pairwise adjacent beams to perform orthogonal encoding or configured to perform multibeam joint orthogonal encoding.

In a possible implementation, the processor is specifically configured to:

receive the channel quality indicator information, and quantize the channel quality indicator information into a linear value y of a signal to interference plus noise ratio obtained before the wavelength division multiplexing;

receive and measure an uplink reference signal or a sounding reference signal sent by the terminal to obtain a multibeam receive level, where a beam with a highest level is a service beam, physically adjacent beams are interference beams, a degree of interference between a service beam and an interference beam is beam isolation, and a linear value x of the beam isolation=a receive level of a service beam/a receive level of an interference beam;

calculate, according to the following formula, a signal to interference plus noise ratio z obtained after the wavelength division:

$$z=(x^*y)/(y+x+1);$$

perform a table lookup according to a mapping table between a signal to interference plus noise ratio and spectral efficiency, to obtain spectral efficiency obtained before the wavelength division multiplexing and spectral efficiency obtained after the wavelength division multiplexing; and subtract the spectral efficiency obtained before the wavelength division multiplexing from the spectral efficiency obtained after the wavelength division multiplexing, to obtain the spectral efficiency gain.

In a possible implementation, if the spectral efficiency gain is positive, radio resource scheduling for the wavelength division multiplexing is performed.

According to a fourth aspect, an embodiment of the present invention provides a computer storage medium, and the computer storage medium includes a set of program code that is used to perform the method according to any implementation of the first aspect of the embodiment of the present invention.

According to a fifth aspect, an embodiment of the present invention provides a scheduling method, including:

receiving, by a terminal, logical port information sent by a base station, wherein orthogonal encoding is performed, by the base station, on logical port information corresponding to a downlink reference signal, the logical port information obtained after the orthogonal encoding is mapped to a corresponding physical channel and sent to the terminal, and the logical port information includes orthogonal beam components;

measuring the logical port information, and obtaining channel quality indicator information by means of calculation; and feeding back the channel quality indicator information to the base station.

According to a sixth aspect, an embodiment of the present invention provides a terminal, including:

a receiving unit, configured to receive logical port information sent by a base station, wherein orthogonal encoding is performed, by the base station, on logical port information corresponding to a downlink reference signal, the logical port information obtained after the orthogonal encoding is mapped to a corresponding physical channel and sent to the terminal, and the logical port information includes orthogonal beam components;

a processing unit, configured to measure the logical port information, and obtain channel quality indicator information by means of calculation; and a sending unit, configured to feed back the channel quality indicator information to the base station.

According to a seventh aspect, an embodiment of the present invention provides a terminal, including:

a processor, a memory, an transceiver, and a bus, where the processor, the memory, and the transceiver are connected by using the bus to complete mutual communication, the transceiver is configured to transmit and receive signals, the memory is configured to store a set of program code, and the processor is configured to call the program code stored in the memory to perform the following operations:

receiving logical port information sent by a base station, wherein orthogonal encoding is performed, by the base station, on logical port information corresponding to a downlink reference signal, the logical port information obtained after the orthogonal encoding is mapped to a corresponding physical channel and sent to the terminal, and the logical port information includes orthogonal beam components;

measuring the logical port information, and obtaining channel quality indicator information by means of calculation; and feeding back the channel quality indicator information to the base station.

According to an eighth aspect, an embodiment of the present invention provides a computer storage medium, and the computer storage medium includes a set of program code that is used to perform the method according to any implementation of the fifth aspect of the embodiment of the present invention.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention.

In the specification, claims, and accompanying drawings of the present invention, the terms "include", "contain" and any other variants mean to cover the non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In a specific application scenario of the embodiments of the present invention, a base station and at least one terminal may be included. The base station is responsible for radio network access, data transmission, spatial radio resource management, and the like of the terminal. The base station has multiple antennas, and may transmit and receive signals by using multiple beams, so as to communicate with the terminal.

The terminal in the embodiments of the present invention may also be referred to as user equipment (UE), and is referred to as a terminal below for ease of description. The terminal may include a smartphone (a phone running on an operating system such as Android, iOS, or Windows Phone), a tablet computer, a palmtop computer, a notebook computer, a mobile Internet device (MID), a wearable device, or the like. The foregoing terminals are only examples rather than exhaustive, and the terminal in the embodiments of the present invention includes but is not limited to the foregoing terminals. This is not limited in the embodiments of the present invention.

In the present invention, content sent when a base station broadcasts a reference signal by using multiple beams is improved. Specific combination (for example, orthogonal encoding) processing is performed on multiple reference signals, and mapped to corresponding beams for sending. Therefore, when the terminal receives the multiple reference signals by using an air interface, information includes components of multiple beams, and terminals distributed in different locations receive different beam components of the reference signals. According to a result and the signal that are fed back by the terminal, the base station may estimate interference between multiple beams and calculate a signal to interference plus noise ratio (SINR) and a spectral efficiency gain obtained after wavelength division, and perform radio resource scheduling for wavelength division multiplexing by using the corrected result. A scheduling method of the present invention is described below in detail with reference to specific embodiments.

Figure 1:
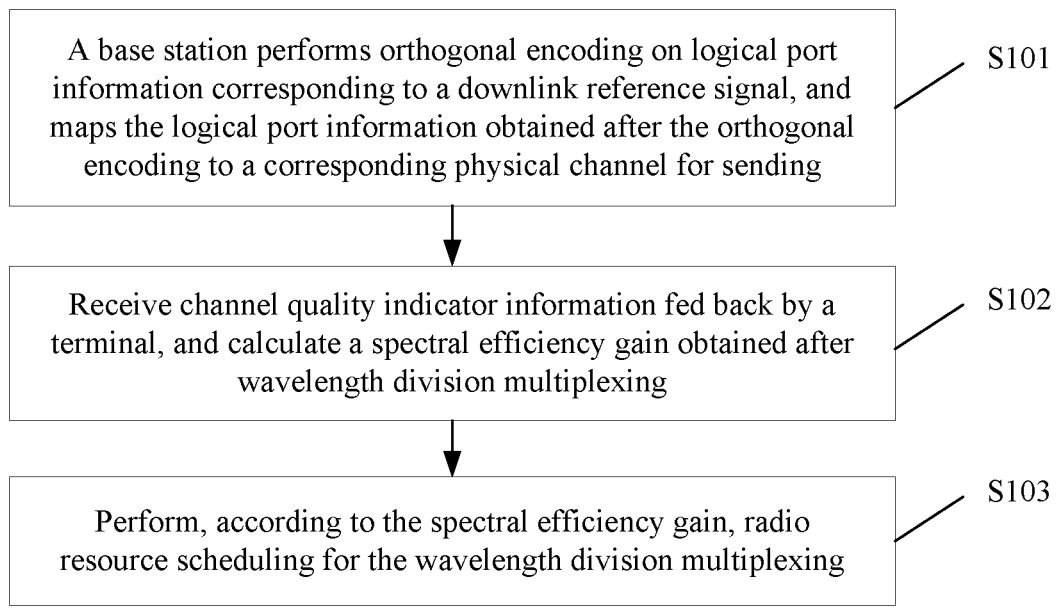
FIG. 1 is a schematic flowchart of an embodiment of a scheduling method according to the present invention.

FIG. 1 is a schematic flowchart of an embodiment of a scheduling method according to the present invention. In this embodiment, the method includes the following steps.

S101. A base station performs orthogonal encoding on logical port information corresponding to a downlink reference signal, and maps the logical port information obtained after the orthogonal encoding to a corresponding physical channel for sending.

Orthogonal encoding is a typical encoding scheme, and has good anti-noise performance, so that interference caused by pulse edge oscillation can be effectively eliminated, and accuracy can be effectively improved during a rate test. In a multibeam sector, multiple beams are in a one-to-one correspondence with multiple physical channels. For a reference signal (RS), the reference signal indicates a logical port that can be sounded by an air interface, and may be included in logical port information. A downlink reference signal may be used for: (1) downlink channel quality measurement; (2) downlink channel estimation, which is used for coherent detection and demodulation of a UE side; and (3) cell searching. By means of orthogonal encoding, logical channel information may be mapped to a corresponding beam for sending. Therefore, each downlink reference signal obtained after the orthogonal encoding includes orthogonal components of multiple beams, so that channel-related data measured by a terminal and fed back to the base station also includes a beam component. Finally, the base station may estimate, according to the feedback data, interference between multiple beams, and calculate an SINR and a spectral efficiency gain obtained after wavelength division.

Optionally, orthogonal encoding mapping may be performed in the following manner:

$$\begin{bmatrix} P^0 \\ M \\ P^{M-1} \end{bmatrix} = \begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

where $P_n$ represents a port number of a logical channel n=0,L, N−1, and N is a quantity of logical channels; $P^m$ represents a beam number, and m=0,L, M−1; and $$\begin{bmatrix} b_0^0 & L & b_{N-1}^0 \\ M & O & M \\ b_0^{M-1} & L & b_{N-1}^{M-1} \end{bmatrix}$$

is a mapping matrix, vectors formed by elements in all rows of the mapping matrix are pairwise orthogonal, and a non-zero element included in each row of the mapping matrix is a weighting coefficient corresponding to a logical channel included in a logical channel group corresponding to the row.

In addition, during orthogonal encoding, if a quantity of logical ports is less than a quantity of multiple beams, pairwise adjacent beams are used to perform orthogonal encoding; or if a quantity of logical ports is greater than or equal to a quantity of multiple beams, pairwise adjacent beams are used to perform orthogonal encoding, or multibeam joint orthogonal encoding is performed.

S102. Receive channel quality indicator (CQI) information fed back by a terminal, and calculate a spectral efficiency gain obtained after wavelength division multiplexing.

The channel quality indicator information is obtained, by the terminal, by measuring the logical port information that includes orthogonal beam components.

Optionally, during calculation, a signal to interference plus noise ratio obtained after wavelength division may be calculated according to the channel quality indicator information fed back by the terminal and the interference between multiple beams, where the interference between multiple beams is obtained, by the base station, by measuring and estimating an uplink reference signal or a sounding reference signal (SRS) that is received; and then spectral efficiency obtained before the wavelength division multiplexing and spectral efficiency obtained after the wavelength division multiplexing are determined in a manner such as a table lookup, and further, a spectral efficiency gain is obtained by means of calculation.

S103. Perform, according to the spectral efficiency gain, radio resource scheduling for the wavelength division multiplexing.

During scheduling, a same time/frequency domain resource may be multiplexed to different terminals.

Optionally, if the spectral efficiency gain is positive, radio resource scheduling for the wavelength division multiplexing is performed; or if the spectral efficiency gain is negative, radio resource scheduling for the wavelength division multiplexing may not be performed; or if the spectral efficiency gain is 0, radio resource scheduling for the wavelength division multiplexing may be performed or may not be performed. This is not limited in this embodiment of the present invention.

In this embodiment, orthogonal encoding processing is performed on reference signals by using multiple beams, and mapped to corresponding physical channels for sending, so that information received by a terminal by using an air interface includes orthogonal beam components. The base station may measure an uplink multibeam receive level, that is, a reference signal received power (RSRP), according to a result fed back by the terminal and according to channel reciprocity. Then, interference between multiple beams is estimated, and a signal to interference plus noise ratio (SINR) and a spectral efficiency gain obtained after wavelength division are calculated, and radio resource scheduling for wavelength division multiplexing is performed by using the corrected result. Therefore, multiple-input multiple-output (MIMO) multiplexing based on a broadcast reference signal is implemented, so that a capacity of a wireless communications system is greatly improved, and a high-quality service may be provided for more terminals.

Figure 2:
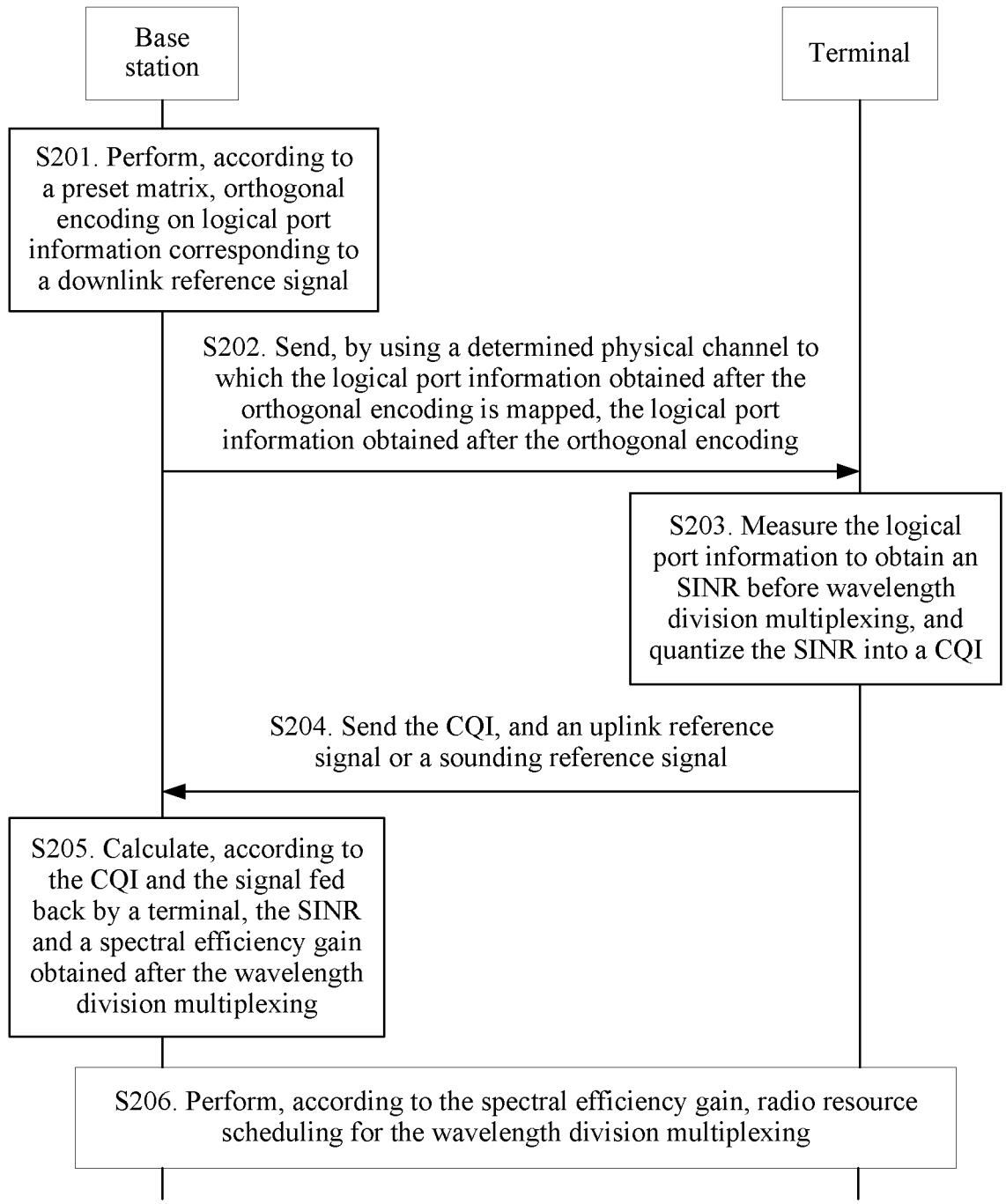
FIG. 2 is a schematic flowchart of an embodiment of another scheduling method according to the present invention.

FIG. 2 is a schematic flowchart of an embodiment of another scheduling method according to the present invention. In this embodiment, the method includes the following steps.

S201. A base station performs, according to a preset matrix, orthogonal encoding on logical port information corresponding to a downlink reference signal.

S202. The base station sends, by using a determined physical channel to which the logical port information obtained after the orthogonal encoding is mapped, the logical port information obtained after the orthogonal encoding.

S203. A terminal receives the logical port information, measures the logical port information to obtain an SINR before wavelength division multiplexing, and quantizes the SINR into a CQI.

S204. The terminal sends the CQI, and an uplink reference signal or a sounding reference signal.

S205. Calculate, according to the CQI and the signal fed back by the terminal, the SINR and a spectral efficiency gain obtained after the wavelength division.

Specifically, when the signal to interference plus noise ratio obtained after wavelength division multiplexing is calculated and the spectral efficiency gain is determined, the base station receives channel quality indicator information, and quantizes the channel quality indicator information into a linear value y of a signal to interference plus noise ratio obtained before the wavelength division.

An uplink reference signal or a sounding reference signal (Sounding Reference Signal, SRS) sent by the terminal is received and measured to obtain a multibeam receive level. A beam with a highest level is a service beam, physically adjacent beams are interference beams, a degree of interference between a service beam and an interference beam is beam isolation, and a linear value x of the beam isolation=a receive level of a service beam/a receive level of an interference beam.

A signal to interference plus noise ratio z obtained after the wavelength division is calculated according to the following formula:

$$z=(x*y)/(y+x+1).$$

A table lookup is performed according to a mapping table between a signal to interference plus noise ratio and spectral efficiency, to obtain spectral efficiency obtained before the wavelength division and spectral efficiency obtained after the wavelength division.

The spectral efficiency obtained before the wavelength division is subtracted from the spectral efficiency obtained after the wavelength division, to obtain the spectral efficiency gain.

The SINR and the spectral efficiency may be determined according to Shannon's equation, and a mapping table between an SINR and spectral efficiency may be obtained by means of conversion according to performance of a receiver of the base station. After the SINR is obtained by means of calculation, spectral efficiency may be determined by performing a table lookup.

S206. Perform, according to the spectral efficiency gain, radio resource scheduling for the wavelength division multiplexing.

Optionally, if the spectral efficiency gain is positive, radio resource scheduling for the wavelength division multiplexing is performed; or if the spectral efficiency gain is negative, radio resource scheduling for the wavelength division multiplexing may not be performed; or if the spectral efficiency gain is 0, radio resource scheduling for the wavelength division multiplexing may be performed or may not be performed. This is not limited in this embodiment of the present invention.

Specifically, during orthogonal encoding, multiple beams in a multibeam sector are in a one-to-one correspondence with multiple physical channels. For a reference signal (RS), the reference signal indicates a logical port that can be sounded by an air interface.

Orthogonal encoding mapping may be performed in the following manner:

$$\begin{bmatrix} P^0 \\ M \\ P^{M-1} \end{bmatrix} = \begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

where $P_n$ represents a port number of a logical channel n=0,L, N−1, and N is a quantity of logical channels; $P^m$ represents a beam number, and m=0,L, M−1; and $$\begin{bmatrix} b_0^0 & L & b_{N-1}^0 \\ M & O & M \\ b_0^{M-1} & L & b_{N-1}^{M-1} \end{bmatrix}$$

is a mapping matrix, vectors formed by elements in all rows of the mapping matrix are pairwise orthogonal, and a non-zero element included in each row of the mapping matrix is a weighting coefficient corresponding to a logical channel included in a logical channel group corresponding to the row.

In addition, during orthogonal encoding, if a quantity of logical ports is less than a quantity of multiple beams, pairwise adjacent beams are used to perform orthogonal encoding; or if a quantity of logical ports is greater than or equal to a quantity of multiple beams, pairwise adjacent beams are used to perform orthogonal encoding, or multibeam joint orthogonal encoding is performed.

For different scenarios, detailed description is as follows:

I. Receive/transmit physical channels of an antenna are in a one-to-one correspondence with air-interface beams. In a multibeam sector, multiple beams are corresponding to multiple physical channels.

(1) In a weighted mapping manner, pairwise adjacent beams may be used to perform orthogonal encoding. For logical port information $$\begin{bmatrix} P_0 \\ P_1 \end{bmatrix},$$

a base station performs weighted mapping processing $$\begin{bmatrix} b_0^0 & b_1^0 \\ b_0^1 & b_1^1 \end{bmatrix} * \begin{bmatrix} P_0 \\ P_1 \end{bmatrix}$$

based on unitary matrix 1

$$\begin{bmatrix} b_0^0 & b_1^0 \\ b_0^1 & b_1^1 \end{bmatrix},$$

and sends obtained information to an adjacent physical channel $$\begin{bmatrix} P^0 \\ P^1 \end{bmatrix};$$

the base station performs weighted mapping processing $$\begin{bmatrix} b_0^1 & b_1^1 \\ b_0^2 & b_1^2 \end{bmatrix} * \begin{bmatrix} P_0 \\ P_1 \end{bmatrix}$$

based on unitary matrix 2

$$\begin{bmatrix} b_0^1 & b_1^1 \\ b_0^2 & b_1^2 \end{bmatrix},$$

and sends obtained information to an adjacent physical channel $$\begin{bmatrix} P^1 \\ P^2 \end{bmatrix};$$

... (the base station sequentially performs mapping until the last piece of logical port information is processed); and the base station performs weighted mapping processing $$\begin{bmatrix} b_0^{M-2} & b_1^{M-2} \\ b_0^{M-1} & b_1^{M-1} \end{bmatrix} * \begin{bmatrix} P_0 \\ P_1 \end{bmatrix}$$

based on unitary matrix M−1

$$\begin{bmatrix} b_0^{M-2} & b_1^{M-2} \\ b_0^{M-1} & b_1^{M-1} \end{bmatrix},$$

and sends obtained information to an adjacent physical channel $$\begin{bmatrix} P^{M-2} \\ P^{M-1} \end{bmatrix}.$$

(2) If a total quantity of logical ports is greater than or equal to a quantity of multiple beams, multibeam joint orthogonal encoding may also be performed. A base station performs orthogonal matrix $$\begin{bmatrix} b_0^0 & L & b_{N-1}^0 \\ M & O & M \\ b_0^{M-1} & L & b_{N-1}^{M-1} \end{bmatrix}$$

weighted mapping processing $$\begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

on logical port information $$\begin{bmatrix} P_0 \\ M \\ P_{N-1} \end{bmatrix},$$

and sends obtained information to an adjacent physical channel $$\begin{bmatrix} P^0 \\ M \\ P^{M-1} \end{bmatrix},$$

where row vectors in $$\begin{bmatrix} b_0^0 & L & b_{N-1}^0 \\ M & O & M \\ b_0^{M-1} & L & b_{N-1}^{M-1} \end{bmatrix}$$

are pairwise orthogonal, and M≤N.

II. In another scenario, an air-interface beam is generated by means of weighting at a receive end and a transmit end of an antenna. A base station performs weighted mapping processing $$\begin{bmatrix} w_0^0 & L & w_{M-1}^0 \\ M & O & M \\ w_0^{L-1} & L & w_{M-1}^{L-1} \end{bmatrix} * \begin{bmatrix} P^0 \\ M \\ P^{M-1} \end{bmatrix}$$

on signals $$\begin{bmatrix} P^0 \\ M \\ P^{M-1} \end{bmatrix}$$

of M beams, where $$\begin{bmatrix} w_m^0 \\ M \\ w_m^{L-1} \end{bmatrix}$$

is a weighted vector corresponding to a beam $P^m$, and obtained information is sent to L physical channels $$\begin{bmatrix} S^0 \\ M \\ S^{L-1} \end{bmatrix}.$$

A whole process is represented by using the following formula:

$$\begin{bmatrix} S^0 \\ M \\ S^{L-1} \end{bmatrix} = \begin{bmatrix} w_0^0 & L & w_{M-1}^0 \\ M & O & M \\ w_0^{L-1} & L & w_{M-1}^{L-1} \end{bmatrix} * \begin{bmatrix} P^0 \\ M \\ P^{M-1} \end{bmatrix}.$$

Therefore, a logical port is mapped to multiple beams and then mapped to physical channels in the following manners:

(1) In a weighted mapping manner, pairwise adjacent beams may be used to perform orthogonal encoding. For logical port information $$\begin{bmatrix} P_0 \\ P_1 \end{bmatrix},$$

the base station performs weighted mapping processing $$\begin{bmatrix} b_0^0 & b_1^0 \\ b_0^1 & b_1^1 \end{bmatrix} * \begin{bmatrix} P_0 \\ P_1 \end{bmatrix}$$

based on unitary matrix 1

$$\begin{bmatrix} b_0^0 & b_1^0 \\ b_0^1 & b_1^1 \end{bmatrix},$$

and uses obtained information as adjacent multibeam $$\begin{bmatrix} P^0 \\ P^1 \end{bmatrix}$$

information; and the base station performs weighting on multibeam information by using a beam weighted value $$\begin{bmatrix} w_0^0 & L & w_1^0 \\ M & O & M \\ w_0^{L-1} & L & w_1^{L-1} \end{bmatrix},$$

to obtain $$\begin{bmatrix} w_0^0 & w_1^0 \\ M & M \\ w_0^{L-1} & w_1^{L-1} \end{bmatrix} * \begin{bmatrix} b_0^0 & b_1^0 \\ b_0^1 & b_1^1 \end{bmatrix} * \begin{bmatrix} P_0 \\ P_1 \end{bmatrix},$$

and then sends obtained information to physical channels $$\begin{bmatrix} S^0 \\ M \\ S^{L-1} \end{bmatrix};$$

the base station performs weighted mapping processing $$\begin{bmatrix} b_0^1 & b_1^1 \\ b_0^2 & b_1^2 \end{bmatrix} * \begin{bmatrix} P_0 \\ P_1 \end{bmatrix}$$

based on unitary matrix 2

$$\begin{bmatrix} b_0^1 & b_1^1 \\ b_0^2 & b_1^2 \end{bmatrix},$$

and uses obtained information as adjacent multibeam $$\begin{bmatrix} P^1 \\ P^2 \end{bmatrix}$$

information; and the base station performs weighting on multibeam information by using a beam weighted value $$\begin{bmatrix} w_1^0 & L & w_2^0 \\ M & O & M \\ w_1^{L-1} & L & w_2^{L-1} \end{bmatrix},$$

to obtain $$\begin{bmatrix} w_1^0 & w_2^0 \\ M & M \\ w_1^{L-1} & w_2^{L-1} \end{bmatrix} * \begin{bmatrix} b_0^1 & b_1^1 \\ b_0^2 & b_1^2 \end{bmatrix} * \begin{bmatrix} P_0 \\ P_1 \end{bmatrix},$$

and then sends obtained information to physical channels $$\begin{bmatrix} S^0 \\ M \\ S^{L-1} \end{bmatrix};$$

. . . (the base station sequentially performs mapping until the last piece of logical port information is processed); and the base station performs weighted mapping processing $$\begin{bmatrix} b_0^{M-2} & b_1^{M-2} \\ b_0^{M-1} & b_1^{M-1} \end{bmatrix} * \begin{bmatrix} P_0 \\ P_1 \end{bmatrix}$$

based on unitary matrix M-1

$$\begin{bmatrix} b_0^{M-2} & b_1^{M-2} \\ b_0^{M-1} & b_1^{M-1} \end{bmatrix},$$

and uses obtained information as adjacent multibeam $$\begin{bmatrix} P^{M-2} \\ P^{M-1} \end{bmatrix}$$

information; and the base station performs weighting on multibeam information by using a beam weighted value $$\begin{bmatrix} w_{M-2}^0 & L & w_{M-1}^0 \\ M & O & M \\ w_{M-2}^{L-1} & L & w_{M-1}^{L-1} \end{bmatrix},$$

to obtain $$\begin{bmatrix} w_{M-2}^0 & w_{M-1}^0 \\ M & M \\ w_{M-2}^{L-1} & w_{M-1}^{L-1} \end{bmatrix} * \begin{bmatrix} b_0^{M-2} & b_1^{M-2} \\ b_0^{M-1} & b_1^{M-1} \end{bmatrix} * \begin{bmatrix} P_0 \\ P_1 \end{bmatrix},$$

and then sends obtained information to physical channels $$\begin{bmatrix} S^0 \\ M \\ S^{L-1} \end{bmatrix}.$$

(2) If a total quantity of logical ports is greater than or equal to a quantity of multiple beams, multibeam joint orthogonal encoding may also be performed. A base station performs orthogonal matrix $$\begin{bmatrix} b_0^0 & L & b_{N-1}^0 \\ M & O & M \\ b_0^{M-1} & L & b_{N-1}^{M-1} \end{bmatrix}$$

weighted mapping processing $$\begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

on logical port information $$\begin{bmatrix} P_0 \\ M \\ P_{N-1} \end{bmatrix},$$

where row vectors in $$\begin{bmatrix} b_0^0 & L & b_{N-1}^0 \\ M & O & M \\ b_0^{M-1} & L & b_{N-1}^{M-1} \end{bmatrix}$$

are pairwise orthogonal, and M≤N, and uses obtained information as adjacent multibeam $$\begin{bmatrix} P0 \\ M \\ P^{M-1} \end{bmatrix}$$

information; and the base station performs weighting on multibeam information by using a beam weighted value $$\begin{bmatrix} w_0^0 & L & w_{M-1}^0 \\ M & O & M \\ w_0^{L-1} & L & w_{M-1}^{L-1} \end{bmatrix},$$

to obtain $$\begin{bmatrix} w_0^0 & L & w_{M-1}^0 \\ M & O & M \\ w_0^{L-1} & L & w_{M-1}^{L-1} \end{bmatrix} * \begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix},$$

and then sends obtained information to physical channels $$\begin{bmatrix} S^0 \\ M \\ S^{L-1} \end{bmatrix}.$$

III. In another scenario, a vertical dimension air-interface beam is generated by means of weighting at a receive end and a transmit end of an antenna. A base station performs weighted mapping processing $$\begin{bmatrix} w_0^0 & L & w_{M-1}^0 \\ M & O & M \\ w_0^{L-1} & L & w_{M-1}^{L-1} \end{bmatrix} * \begin{bmatrix} P^0 \\ M \\ P^{M-1} \end{bmatrix}$$

on signals $$\begin{bmatrix} P^0 \\ M \\ P^{M-1} \end{bmatrix}$$

of M beams, where $$\begin{bmatrix} w_m^0 \\ M \\ w_m^{L-1} \end{bmatrix}$$

is a weighted vector corresponding to a beam $P^m$, and obtained information is sent to L physical channels $$\begin{bmatrix} S^0 \\ M \\ S^{L-1} \end{bmatrix}.$$

A whole process is represented by using the following formula:

$$\begin{bmatrix} S^0 \\ M \\ S^{L-1} \end{bmatrix} = \begin{bmatrix} w_0^0 & L & w_{M-1}^0 \\ M & O & M \\ w_0^{L-1} & L & w_{M-1}^{L-1} \end{bmatrix} * \begin{bmatrix} P^0 \\ M \\ P^{M-1} \end{bmatrix}.$$

Therefore, a logical port is mapped to multiple beams and then mapped to physical channels in the following manners:

(1) In a weighted mapping manner, pairwise adjacent beams may be used to perform orthogonal encoding. For logical port information $$\begin{bmatrix} P_0 \\ P_1 \end{bmatrix},$$

the base station performs weighted mapping processing $$\begin{bmatrix} b_0^0 & b_1^0 \\ b_0^1 & b_1^1 \end{bmatrix} * \begin{bmatrix} P_0 \\ P_1 \end{bmatrix}$$

based on unitary matrix 1

$$\begin{bmatrix} b_0^0 & b_1^0 \\ b_0^1 & b_1^1 \end{bmatrix},$$

and uses obtained information as adjacent multibeam $$\begin{bmatrix} P^0 \\ P^1 \end{bmatrix}$$

information; and the base station performs weighting on multibeam information by using a beam weighted value $$\begin{bmatrix} w_0^0 & L & w_1^0 \\ M & O & M \\ w_0^{L-1} & L & w_1^{L-1} \end{bmatrix},$$

to obtain $$\begin{bmatrix} w_0^0 & w_1^0 \\ M & M \\ w_0^{L-1} & w_1^{L-1} \end{bmatrix} * \begin{bmatrix} b_0^0 & b_1^0 \\ b_0^1 & b_1^1 \end{bmatrix} * \begin{bmatrix} P_0 \\ P_1 \end{bmatrix},$$

and then sends obtained information to physical channels $$\begin{bmatrix} S^0 \\ M \\ S^{L-1} \end{bmatrix};$$

the base station performs weighted mapping processing $$\begin{bmatrix} b_0^1 & b_1^1 \\ b_0^2 & b_1^2 \end{bmatrix} * \begin{bmatrix} P_0 \\ P_1 \end{bmatrix}$$

based on unitary matrix 2

$$\begin{bmatrix} b_0^1 & b_1^1 \\ b_0^2 & b_1^2 \end{bmatrix},$$

and uses obtained information as adjacent multibeam $$\begin{bmatrix} P^1 \\ P^2 \end{bmatrix}$$

information; and the base station performs weighting on multibeam information by using a beam weighted value $$\begin{bmatrix} w_1^0 & L & w_2^0 \\ M & O & M \\ w_1^{L-1} & L & w_2^{L-1} \end{bmatrix},$$

to obtain $$\begin{bmatrix} w_1^0 & w_2^0 \\ M & M \\ w_1^{L-1} & w_2^{L-1} \end{bmatrix} * \begin{bmatrix} b_0^1 & b_1^1 \\ b_0^2 & b_1^2 \end{bmatrix} * \begin{bmatrix} P_0 \\ P_1 \end{bmatrix},$$

and then sends obtained information to physical channels $$\begin{bmatrix} S^0 \\ M \\ S^{L-1} \end{bmatrix};$$

. . . (the base station sequentially performs mapping until the last piece of logical port information is processed); and the base station performs weighted mapping processing $$\begin{bmatrix} b_0^{M-2} & b_1^{M-2} \\ b_0^{M-1} & b_1^{M-1} \end{bmatrix} * \begin{bmatrix} P_0 \\ P_1 \end{bmatrix},$$

based on unitary matrix M−1

$$\begin{bmatrix} b_0^{M-2} & b_1^{M-2} \\ b_0^{M-1} & b_1^{M-1} \end{bmatrix},$$

and uses obtained information as adjacent multibeam $$\begin{bmatrix} P^{M-2} \\ P^{M-1} \end{bmatrix}$$

information; and the base station performs weighting on multibeam information by using a beam weighted value $$\begin{bmatrix} w_{M-2}^0 & L & w_{M-1}^0 \\ M & O & M \\ w_{M-2}^{L-1} & L & w_{M-1}^{L-1} \end{bmatrix},$$

to obtain $$\begin{bmatrix} w_{M-2}^0 & w_{M-1}^0 \\ M & M \\ w_{M-2}^{L-1} & w_{M-1}^{L-1} \end{bmatrix} * \begin{bmatrix} b_0^{M-2} & b_1^{M-2} \\ b_0^{M-1} & b_1^{M-1} \end{bmatrix} * \begin{bmatrix} P_0 \\ P_1 \end{bmatrix},$$

and then sends obtained information to physical channels $$\begin{bmatrix} S^0 \\ M \\ S^{L-1} \end{bmatrix}.$$

(2) If a total quantity of logical ports is greater than or equal to a quantity of multiple beams, multibeam joint orthogonal encoding may also be performed. A base station performs orthogonal matrix $$\begin{bmatrix} b_0^0 & L & b_{N-1}^0 \\ M & O & M \\ b_0^{M-1} & L & b_{N-1}^{M-1} \end{bmatrix}$$

weighted mapping processing $$\begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

on logical port information $$\begin{bmatrix} P_0 \\ M \\ P_{N-1} \end{bmatrix},$$

where row vectors in $$\begin{bmatrix} b_0^0 & L & b_{N-1}^0 \\ M & O & M \\ b_0^{M-1} & L & b_{N-1}^{M-1} \end{bmatrix}$$

are pairwise orthogonal, and M≤N, and uses obtained information as adjacent multibeam $$\begin{bmatrix} P0 \\ M \\ P^{M-1} \end{bmatrix}$$

information; and the base station performs weighting on multibeam information by using a beam weighted value $$\begin{bmatrix} w_0^0 & L & w_{M-1}^0 \\ M & O & M \\ w_0^{L-1} & L & w_{M-1}^{L-1} \end{bmatrix},$$

to obtain $$\begin{bmatrix} w_0^0 & L & w_{M-1}^0 \\ M & O & M \\ w_0^{L-1} & L & w_{M-1}^{L-1} \end{bmatrix} * \begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix},$$

and then sends obtained information to physical channels $$\begin{bmatrix} S^0 \\ M \\ S^{L-1} \end{bmatrix}.$$

In this embodiment, a calculation process of an SINR and a spectral efficiency gain obtained after wavelength division is described in detail, and orthogonal encoding mapping in different scenarios is described. Orthogonal encoding pre-processing is performed on a reference signal by using multiple beams, and with reference to a terminal feedback and determining and correction of a multibeam measurement based on reciprocity, MIMO multiplexing based on a broadcast reference signal is implemented, so that a capacity of a multi-antenna system can be greatly improved, and in particular, a situation of a currently limited broadcast control channel is greatly improved.

Figure 3:
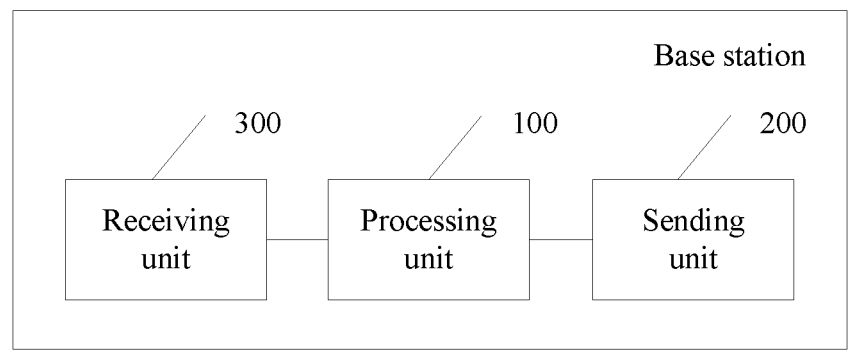
FIG. 3 is a schematic diagram of composition of an embodiment of a base station according to the present invention.

FIG. 3 is a schematic diagram of composition of a base station according to an embodiment of the present invention. In this embodiment, the base station includes:

a processing unit 100, configured to perform, according to a preset matrix, orthogonal encoding on logical port information corresponding to a downlink reference signal, and map the logical port information obtained after the orthogonal encoding to a corresponding physical channel for sending, where the logical port information obtained after the orthogonal encoding includes orthogonal beam components;

a sending unit 200, configured to send the logical port information obtained after the orthogonal encoding to a terminal; and a receiving unit 300, configured to receive channel quality indicator information fed back by the terminal, where the channel quality indicator information is obtained, by the terminal, by measuring the logical port information that includes the orthogonal beam components.

The processing unit 100 is further configured to calculate a spectral efficiency gain obtained after wavelength division multiplexing, and perform, according to the spectral efficiency gain, radio resource scheduling for the wavelength division multiplexing.

Optionally, the processing unit 100 is specifically configured to perform orthogonal encoding mapping in the following manner:

$$\begin{bmatrix} P^0 \\ M \\ P^{M-1} \end{bmatrix} = \begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

where $P_n$ represents a port number of a logical channel n=0,L, N−1, and $N_{is}$ a quantity of logical channels; $P^m$ represents a beam number, and m=0,L, M−1; and $$\begin{bmatrix} b_0^0 & L & b_{N-1}^0 \\ M & O & M \\ b_0^{M-1} & L & b_{N-1}^{M-1} \end{bmatrix}$$

is a mapping matrix, vectors formed by elements in all rows of the mapping matrix are pairwise orthogonal, and a non-zero element included in each row of the mapping matrix is a weighting coefficient corresponding to a logical channel included in a logical channel group corresponding to the row.

Optionally, in a multibeam sector, each beam is corresponding to one physical channel, and if a quantity of logical ports is less than a quantity of multiple beams, the encoding unit is specifically configured to use pairwise adjacent beams to perform orthogonal encoding; or if a quantity of logical ports is greater than or equal to a quantity of multiple beams, the encoding unit is specifically configured to use pairwise adjacent beams to perform orthogonal encoding or configured to perform multibeam joint orthogonal encoding.

Optionally, the processing unit 100 is specifically configured to:

receive the channel quality indicator information, and quantize the channel quality indicator information into a linear value y of a signal to interference plus noise ratio obtained before the wavelength division multiplexing;

receive and measure an uplink reference signal or a sounding reference signal sent by the terminal to obtain a multibeam receive level, where a beam with a highest level is a service beam, physically adjacent beams are interference beams, a degree of interference between a service beam and an interference beam is beam isolation, and a linear value x of the beam isolation=a receive level of a service beam/a receive level of an interference beam;

calculate, according to the following formula, a signal to interference plus noise ratio z obtained after the wavelength division:

$z=(x*y)/(y+x+1);$ perform a table lookup according to a mapping table between a signal to interference plus noise ratio and spectral efficiency, to obtain spectral efficiency obtained before the wavelength division multiplexing and spectral efficiency obtained after the wavelength division multiplexing; and subtract the spectral efficiency obtained before the wavelength division multiplexing from the spectral efficiency obtained after the wavelength division multiplexing, to obtain the spectral efficiency gain.

Optionally, the processing unit is specifically configured to:

if the spectral efficiency gain is positive, perform radio resource scheduling for the wavelength division multiplexing.

It should be noted that the processing unit 100, the sending unit 200, and the receiving unit 300 may exist individually, or may be disposed in an integrated manner. In the embodiment of the foregoing base station, the processing unit 100, the sending unit 200, or the receiving unit 300 may be independent of a processor of the base station in a form of hardware and be disposed individually, and may be disposed in a form of a microprocessor; or may be built in a processor of the base station in a form of hardware; or may be stored into a memory of the base station in a form of software, so that a processor of the base station calls and performs operations corresponding to the foregoing processing unit 100, the sending unit 200, and the receiving unit 300.

For example, in the embodiment of the base station in the present invention (the embodiment shown in FIG. 3), the processing unit 100 may be the processor of the base station; functions of the sending unit 200 and the receiving unit 300 may be embedded into the processor, or may be independent of the processor and be disposed individually, or may be stored into the memory in a form of software, so that the processor calls and implements the functions of the sending unit 200 and the receiving unit 300. The foregoing processor may be a central processing unit (CPU), a microprocessor, a single-chip microcomputer, or the like.

Figure 4:
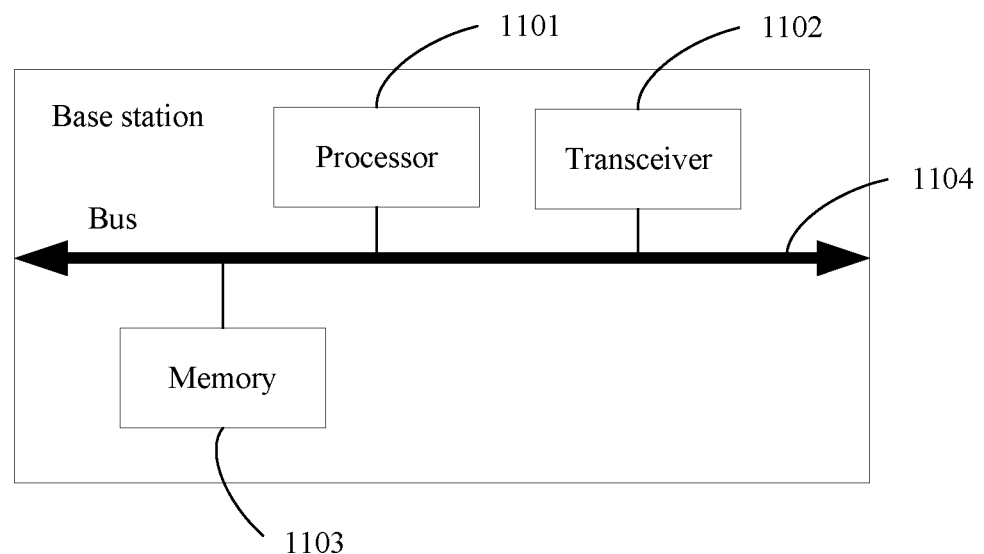
FIG. 4 is a schematic diagram of composition of an embodiment of another base station according to the present invention.

FIG. 4 is a schematic diagram of composition of another base station according to an embodiment of the present invention. In this embodiment of the present invention, the base station includes:

a processor 1101, a transceiver 1102, a memory 1103, and a bus 1104, where the processor 1101, the memory 1103, and the transceiver 1102 are connected by using the bus 1104 to complete mutual communication, the transceiver 1102 is configured to transmit and receive signals, so as to communicate with a terminal. The memory 1103 is configured to store a set of program code, and the processor 1101 is configured to call the program code stored in the memory 1103 to perform the following operations:

performing, according to a preset matrix, orthogonal encoding on logical port information corresponding to a downlink reference signal, and mapping the logical port information obtained after the orthogonal encoding to a corresponding physical channel for sending, where the logical port information obtained after the orthogonal encoding includes orthogonal beam components;

receiving channel quality indicator information fed back by a terminal, and calculating a spectral efficiency gain obtained after wavelength division multiplexing, where the channel quality indicator information is obtained, by the terminal, by measuring the logical port information that includes the orthogonal beam components; and performing, according to the spectral efficiency gain, radio resource scheduling for the wavelength division multiplexing.

Optionally, the processor 1101 is specifically configured to perform orthogonal encoding mapping in the following manner:

$$\begin{bmatrix} P^0 \\ M \\ P^{M-1} \end{bmatrix} = \begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

where $P_n$ represents a port number of a logical channel n=0,L, N−1, and N is a quantity of logical channels; $P^m$ represents a beam number, and m=0,L, M−1; and $$\begin{bmatrix} b_0^0 & L & b_{N-1}^0 \\ M & O & M \\ b_0^{M-1} & L & b_{N-1}^{M-1} \end{bmatrix}$$

is a mapping matrix, vectors formed by elements in all rows of the mapping matrix are pairwise orthogonal, and a non-zero element included in each row of the mapping matrix is a weighting coefficient corresponding to a logical channel included in a logical channel group corresponding to the row.

Optionally, in a multibeam sector, each beam is corresponding to one physical channel, and if a quantity of logical ports is less than a quantity of multiple beams, the processor 1101 is specifically configured to use pairwise adjacent beams to perform orthogonal encoding; or if a quantity of logical ports is greater than or equal to a quantity of multiple beams, the processor 1101 is specifically configured to use pairwise adjacent beams to perform orthogonal encoding or configured to perform multibeam joint orthogonal encoding.

Optionally, the processor 1101 is specifically configured to:

receive the channel quality indicator information, and quantize the channel quality indicator information into a linear value y of a signal to interference plus noise ratio obtained before the wavelength division multiplexing;

receive and measure an uplink reference signal or a sounding reference signal sent by the terminal to obtain a multibeam receive level, where a beam with a highest level is a service beam, physically adjacent beams are interference beams, a degree of interference between a service beam and an interference beam is beam isolation, and a linear value x of the beam isolation=a receive level of a service beam/a receive level of an interference beam;

calculate, according to the following formula, a signal to interference plus noise ratio z obtained after the wavelength division:

$$z=(x*y)/(y+x+1);$$

perform a table lookup according to a mapping table between a signal to interference plus noise ratio and spectral efficiency, to obtain spectral efficiency obtained before the wavelength division multiplexing and spectral efficiency obtained after the wavelength division multiplexing; and subtract the spectral efficiency obtained before the wavelength division multiplexing from the spectral efficiency obtained after the wavelength division multiplexing, to obtain the spectral efficiency gain.

It should be noted that the processor 1101 herein may be one processor, or may be a general term of multiple processing elements. For example, the processor may be a central processing unit (CPU), or may be an application-specific integrated circuit (ASIC), or may be configured as one or more integrated circuits that implement the embodiments of the present invention.

The memory 1103 may be a storage apparatus, or may be a general term of multiple storage elements, and is configured to store executable program code, or a parameter, data, and the like that are required for running of an access network device. In addition, the memory 1103 may include a random access memory (RAM), and may further include a non-volatile memory, for example, a disk memory or a flash memory (Flash).

The bus 1104 may be classified into an address bus, a data bus, a control bus, and the like. For ease of denotation, the bus is represented by using only one thick line in FIG. 4, but it does not indicate that there is only one bus or one type of bus.

The base station described in this embodiment may be configured to implement some or all of the procedures of the method embodiment described in the present invention with reference to FIG. 1 and FIG. 2, and perform some or all of the functions of the apparatus embodiment described in the present invention with reference to FIG. 3. Details are not described herein again.

Figure 5:
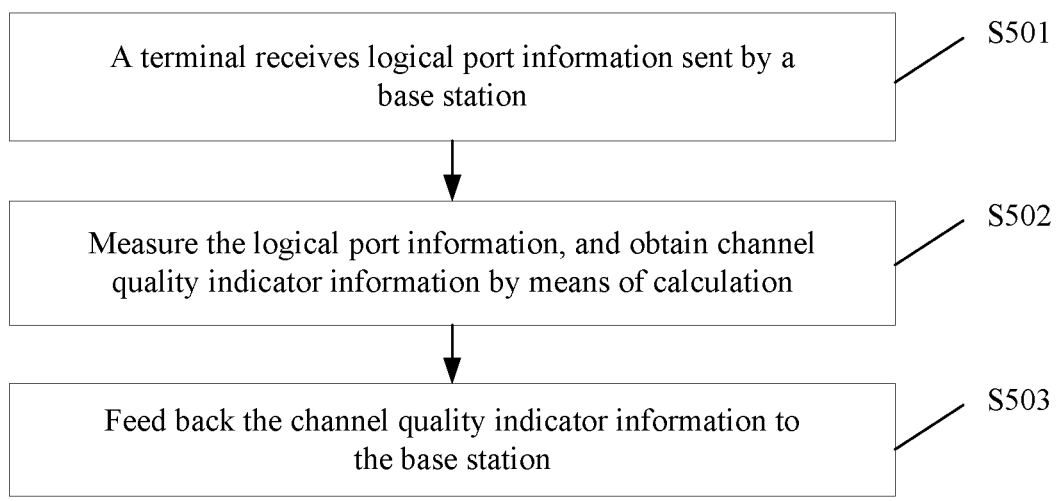
FIG. 5 is a schematic flowchart of an embodiment of still another scheduling method according to the present invention.

FIG. 5 is a schematic flowchart of an embodiment of still another scheduling method according to the present invention. In this embodiment, the method includes the following steps.

S501. A terminal receives logical port information sent by a base station.

Wherein orthogonal encoding is performed, by the base station, on logical port information corresponding to a downlink reference signal, the logical port information obtained after the orthogonal encoding is mapped to a corresponding physical channel and sent to the terminal, and the logical port information includes orthogonal beam components.

S502. Measure the logical port information, and obtain channel quality indicator information by means of calculation.

S503. Feed back the channel quality indicator information to the base station.

After receiving the channel quality indicator information, the base station may calculate a spectral efficiency gain according to the information and finally determine whether to perform radio resource scheduling for wavelength division multiplexing.

For a specific process, refer to description in the method embodiment of a base station side. Details are not described herein again.

Figure 6:
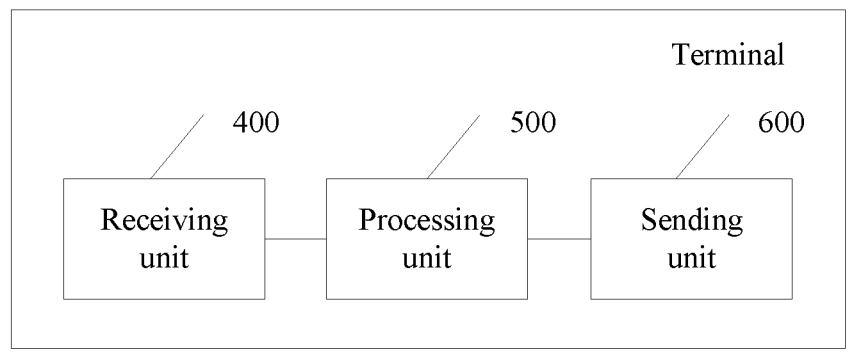
FIG. 6 is a schematic diagram of composition of an embodiment of a terminal according to the present invention.

FIG. 6 is a schematic diagram of composition of an embodiment of a terminal according to the present invention. In this embodiment, the terminal includes:

a receiving unit 400, configured to receive logical port information sent by a base station, wherein orthogonal encoding is performed, by the base station, on logical port information corresponding to a downlink reference signal, the logical port information obtained after the orthogonal encoding is mapped to a corresponding physical channel and sent to the terminal, and the logical port information includes orthogonal beam components;

a processing unit 500, configured to measure the logical port information, and obtain channel quality indicator information by means of calculation; and a sending unit 600, configured to feed back the channel quality indicator information to the base station.

Figure 7:
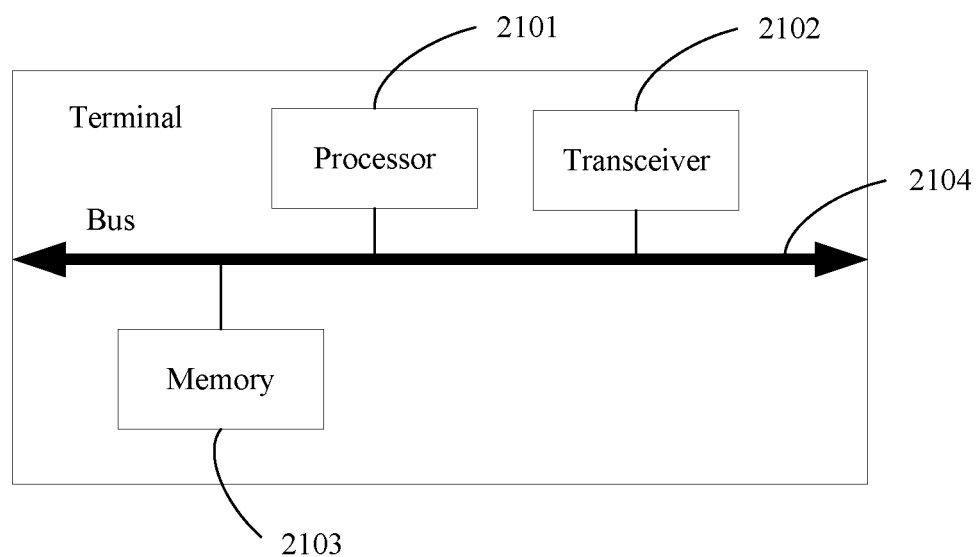
FIG. 7 is a schematic diagram of composition of an embodiment of another terminal according to the present invention.

FIG. 7 is a schematic diagram of composition of an embodiment of another terminal according to the present invention. In this embodiment, the terminal includes:

a processor 2101, a memory 2103, an transceiver 2102, and a bus 2104, where the processor 2101, the memory 2103, the transceiver 2102 are connected by using the bus 2104 to complete mutual communication, the transceiver 2102 is configured to transmit and receive signals, the memory 2103 is configured to store a set of program code, and the processor 2101 is configured to call the program code stored in the memory 2103 to perform the following operations:

receiving logical port information sent by a base station, wherein orthogonal encoding is performed, by the base station, on logical port information corresponding to a downlink reference signal, the logical port information obtained after the orthogonal encoding is mapped to a corresponding physical channel and sent to the terminal, and the logical port information includes orthogonal beam components;

measuring the logical port information, and obtaining channel quality indicator information by means of calculation; and feeding back the channel quality indicator information to the base station.

It should be noted that the processor 2101 herein may be one processor, or may be a general term of multiple processing elements. For example, the processor may be a central processing unit (CPU), or may be an application-specific integrated circuit (ASIC), or may be configured as one or more integrated circuits that implement the embodiments of the present invention.

The memory 2103 may be a storage apparatus, or may be a general term of multiple storage elements, and is configured to store executable program code, or a parameter, data, and the like that are required for running of an access network device. In addition, the memory 2103 may include a random access memory (RAM), and may further include a non-volatile memory, for example, a disk memory or a flash memory (Flash).

The bus 2104 may be classified into an address bus, a data bus, a control bus, and the like. For ease of denotation, the bus is represented by using only one thick line in FIG. 7, but it does not indicate that there is only one bus or one type of bus.

The terminal described in this embodiment may be configured to implement some or all of the procedures of the method embodiment described in the present invention with reference to FIG. 5, and perform some or all of the functions of the apparatus embodiment described in the present invention with reference to FIG. 6. Details are not described herein again.

In one or more embodiments, the described functions may be implemented by hardware, software, firmware, or any combination thereof. If the functions are implemented by the software, the functions may be stored in a computer-readable medium as one or more instructions or code, or sent by a computer-readable medium, and is/are executed by a processing unit based on the hardware. The computer-readable medium may include a computer-readable storage medium (which is corresponding to a tangible medium such as a data storage medium) or a communications medium, and the communications medium includes, for example, any medium that promotes transmission of data, by using a computer program, from a place to another place according to a communications protocol. In this manner, the computer-readable medium may be generally corresponding to: (1) a non-transitory tangible computer-readable storage medium, or (2) a communications medium such as a signal or a carrier. A data storage medium may be accessed by one or more computers or one or more processors to retrieve an instruction, code, and/or a data structure for implementing any available medium in technologies described in the present invention. A computer program product may include a computer-readable medium.

By way of example and not limitation, some computer-readable storage media may include a RAM, a ROM, an EEPROM, a CD-ROM, another optical disc storage or magnetic disk storage, another magnetic storage apparatus, a flash memory, or any other medium that can store required program code in a form of an instruction or a data structure and can be accessed by a computer. In addition, any connection may be appropriately referred to as a computer-readable medium. For example, if an instruction is sent from a website, a server, or another remote source by using a coaxial cable, an optical cable, a twisted pair, a digital subscriber line (DSL), or a wireless technology (for example, infrared, radio, or microwave), the coaxial cable, the optical cable, the twisted pair, the DSL, or the wireless technology (for example, infrared, radio, or microwave) is included in a definition of a medium. However, it should be understood that the computer-readable storage medium and the data storage medium may not include a connection, a carrier, a signal, or another transitory medium, but are non-transitory tangible storage media. A disk and an optical disc used in this specification include a compact disc (CD), a laser disc, an optical disc, a digital versatile disc (DVD), a floppy disk, and a Blu-ray disc, where the disk generally magnetically copies data, and the optical disc optically copies data by using a laser. A combination of the foregoing objects shall further be included in the scope of the computer-readable medium.

An instruction may be executed by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term "processor" used in this specification may refer to the foregoing structure, or any other structure that may be applied to implementation of the technologies described in this specification. In addition, in some aspects, the functions described in this specification may be provided in a dedicated hardware and/or software module configured for encoding and decoding, or may be incorporated into a combined coder-decoder. In addition, the technologies may be completely implemented in one or more circuits or logic elements.

The technologies in the present invention may be widely implemented by multiple apparatuses or devices. The apparatuses or devices include a radio handset, an integrated circuit (IC), or an IC set (for example, a chip set). In the present invention, various components, modules, and units are described to emphasize functions of an apparatus that is configured to implement the disclosed technologies, and the functions do not necessarily need to be implemented by different hardware units. Precisely, as described in the foregoing, various units may be combined into a coder-decoder hardware unit, or may be provided by a set of interoperable hardware units (including one or more processors described in the foregoing) and appropriate software and/or firmware.

It should be understood that "one embodiment" or "an embodiment" mentioned in the whole specification does not mean that particular features, structures, or characteristics related to the embodiment are included in at least one embodiment of the present invention. Therefore, "in one embodiment" or "in an embodiment" appearing throughout the specification does not necessarily refer to a same embodiment. In addition, these particular features, structures, or characteristics may be combined in one or more embodiments by using any appropriate manner.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining A according to B does not mean that B is determined according to A only; that is, B may also be determined according to A and/or other information.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

The foregoing descriptions are merely specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A scheduling method, comprising:

performing, by a base station, orthogonal encoding on logical port information corresponding to a downlink reference signal, and mapping the logical port information obtained after the orthogonal encoding to a corresponding physical channel for sending, wherein the logical port information obtained after the orthogonal encoding comprises orthogonal beam components;

receiving, by a terminal, channel quality indicator information fed back, and calculating a spectral efficiency gain obtained after wavelength division multiplexing, wherein the channel quality indicator information is obtained, by the terminal, by measuring the logical port information that comprises the orthogonal beam components; and performing, according to the spectral efficiency gain, radio resource scheduling for the wavelength division multiplexing.

2. The method according to claim 1, wherein the base station performs the orthogonal encoding on the logical port information corresponding to the downlink reference signal, and maps the logical port information obtained after the orthogonal encoding to the corresponding physical channel for sending, wherein orthogonal encoding mapping is performed in the following manner:

$$\begin{bmatrix} P^0 \\ M \\ P^{M-1} \end{bmatrix} = \begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

wherein $P_n$ represents a port number of a logical channel, $n=0, L, N-1$, and N is a quantity of logical channels; $P^m$ represents a beam number, and $m=0, L, M-1$; and $$\begin{bmatrix} b_0^0 & L & b_{N-1}^0 \\ M & O & M \\ b_0^{M-1} & L & b_{N-1}^{M-1} \end{bmatrix}$$

is a mapping matrix, vectors formed by elements in all rows of the mapping matrix are pairwise orthogonal, and a non-zero element comprised in each row of the mapping matrix is a weighting coefficient corresponding to a logical channel comprised in a logical channel group corresponding to the row.

3. The method according to claim 1, wherein in a multibeam sector, each beam corresponds to one physical channel, and if a quantity of logical ports is less than a quantity of multiple beams, pairwise adjacent beams are used to perform orthogonal encoding; or if a quantity of logical ports is greater than or equal to a quantity of multiple beams, pairwise adjacent beams are used to perform orthogonal encoding, or multibeam joint orthogonal encoding is performed.

4. The method according to claim 1, wherein the receiving channel quality indicator information fed back by a terminal, and calculating a spectral efficiency gain obtained after wavelength division multiplexing comprises:

receiving, by the base station, the channel quality indicator information, and quantizing the channel quality indicator information into a linear value y of a signal to interference plus noise ratio obtained before the wavelength division multiplexing;

receiving and measuring an uplink reference signal or a sounding reference signal sent by the terminal to obtain a multibeam receive level, wherein a beam with a highest level is a service beam, physically adjacent beams are interference beams, a degree of interference between a service beam and an interference beam is beam isolation, and a linear value x of the beam isolation equals a receive level of a service beam divided by a receive level of an interference beam;

calculating, according to the following formula, a signal to interference plus noise ratio z obtained after the wavelength division:

$z=(x*y)/(y+x+1)$;

performing a table lookup according to a mapping table between a signal to interference plus noise ratio and spectral efficiency, to obtain spectral efficiency obtained before the wavelength division multiplexing and spectral efficiency obtained after the wavelength division multiplexing; and subtracting the spectral efficiency obtained before the wavelength division multiplexing from the spectral efficiency obtained after the wavelength division multiplexing, to obtain the spectral efficiency gain.

5. The method according to claim 1, wherein if the spectral efficiency gain is positive, radio resource scheduling for the wavelength division multiplexing is performed.

6. A base station, comprising:

a processor, a non-transitory memory, a transceiver, and a bus, wherein the processor, the memory, and the transceiver are connected by using the bus to complete mutual communication, the transceiver is configured to transmit and receive signals, the memory is configured to store a set of program code, and the processor is configured to call the program code stored in the memory to perform the following operations:

performing, according to a preset matrix, orthogonal encoding on logical port information corresponding to a downlink reference signal, and mapping the logical port information obtained after the orthogonal encoding to a corresponding physical channel for sending, wherein the logical port information obtained after the orthogonal encoding comprises orthogonal beam components;

transmitting to a terminal, channel quality indicator information fed back, wherein the terminal calculates a spectral efficiency gain obtained after wavelength division multiplexing, wherein the channel quality indicator information is obtained, by the terminal, by measuring the logical port information that comprises the orthogonal beam components; and performing, according to the spectral efficiency gain, radio resource scheduling for the wavelength division multiplexing.

7. The base station according to claim 6, wherein the processor is configured to perform orthogonal encoding mapping in the following manner:

$$\begin{bmatrix} P^0 \\ M \\ P^{M-1} \end{bmatrix} = \begin{bmatrix} b_0^0 & L & b_{N-1}^0 \\ M & O & M \\ b_0^{M-1} & L & b_{N-1}^{M-1} \end{bmatrix} * \begin{bmatrix} P_0 \\ M \\ P_{N-1} \end{bmatrix}$$

wherein $P_n$ represents a port number of a logical channel, n=0,L, N−1, and N is a quantity of logical channels; $P^m$ represents a beam number, and m=0,L, M−1; and $$\begin{bmatrix} b_0^0 & L & b_{N-1}^0 \\ M & O & M \\ b_0^{M-1} & L & b_{N-1}^{M-1} \end{bmatrix}$$

is a mapping matrix, vectors formed by elements in all rows of the mapping matrix are pairwise orthogonal, and a non-zero element comprised in each row of the mapping matrix is a weighting coefficient corresponding to a logical channel comprised in a logical channel group corresponding to the row.

8. The base station according to claim 6, wherein in a multibeam sector, each beam corresponds to one physical channel, and if a quantity of logical ports is less than a quantity of multiple beams, the processor is specifically configured to use pairwise adjacent beams to perform orthogonal encoding; or if a quantity of logical ports is greater than or equal to a quantity of multiple beams, the processor is specifically configured to use pairwise adjacent beams to perform orthogonal encoding or configured to perform multibeam joint orthogonal encoding.

9. The base station according to claim 6, wherein the processor is specifically configured to:
receive the channel quality indicator information, and quantize the channel quality indicator information into a linear value y of a signal to interference plus noise ratio obtained before the wavelength division multiplexing;
receive and measure an uplink reference signal or a sounding reference signal sent by the terminal to obtain a multibeam receive level, wherein a beam with a highest level is a service beam, physically adjacent beams are interference beams, a degree of interference between a service beam and an interference beam is beam isolation, and a linear value x of the beam isolation equals a receive level of a service beam divided by a receive level of an interference beam;
calculate, according to the following formula, a signal to interference plus noise ratio z obtained after the wavelength division:

$z=(x*y)/(y+x+1)$;

perform a table lookup according to a mapping table between a signal to interference plus noise ratio and spectral efficiency, to obtain spectral efficiency obtained before the wavelength division multiplexing and spectral efficiency obtained after the wavelength division multiplexing; and
subtract the spectral efficiency obtained before the wavelength division multiplexing from the spectral efficiency obtained after the wavelength division multiplexing, to obtain the spectral efficiency gain.

10. The base station according to claim 6, wherein if the spectral efficiency gain is positive, radio resource scheduling for the wavelength division multiplexing is performed.

11. A scheduling method, comprising:
receiving, by a terminal, logical port information sent by a base station, wherein orthogonal encoding is performed, by the base station, on logical port information corresponding to a downlink reference signal, the logical port information obtained after the orthogonal encoding is mapped to a corresponding physical channel and sent to the terminal, and the logical port information comprises orthogonal beam components;
measuring the logical port information, and obtaining channel quality indicator information and calculating a spectral efficiency gain obtained after wavelength division multiplexing, wherein the channel quality indicator information is obtained, by the terminal, by measuring the logical port information that comprises the orthogonal beam components; and
feeding back the channel quality indicator information to the base station.

12. A terminal, comprising:
a processor, a non-transitory memory, a transceiver, and a bus, wherein the processor, the memory, and the transceiver are connected by using the bus to complete mutual communication, the transceiver is configured to transmit and receive signals, the memory is configured to store a set of program code, and the processor is configured to call the program code stored in the memory to perform the following operations:
receiving logical port information sent by a base station, wherein orthogonal encoding is performed, by the base station, on logical port information corresponding to a downlink reference signal, the logical port information obtained after the orthogonal encoding is mapped to a corresponding physical channel and sent to the terminal, and the logical port information comprises orthogonal beam components;
measuring the logical port information, and obtaining channel quality indicator information and calculating a spectral efficiency gain obtained after wavelength division multiplexing, wherein the channel quality indicator information is obtained, by the terminal, by measuring the logical port information that comprises the orthogonal beam components; and
feeding back the channel quality indicator information to the base station.

13. A computer storage medium, wherein a computer program is stored on the computer storage medium, and when the program is executed by a processor, the method according to claim 1 is implemented.

14. A program, wherein when executed by a processor, the method according to claim 1 is implemented.

* * * * *